Figure 1:
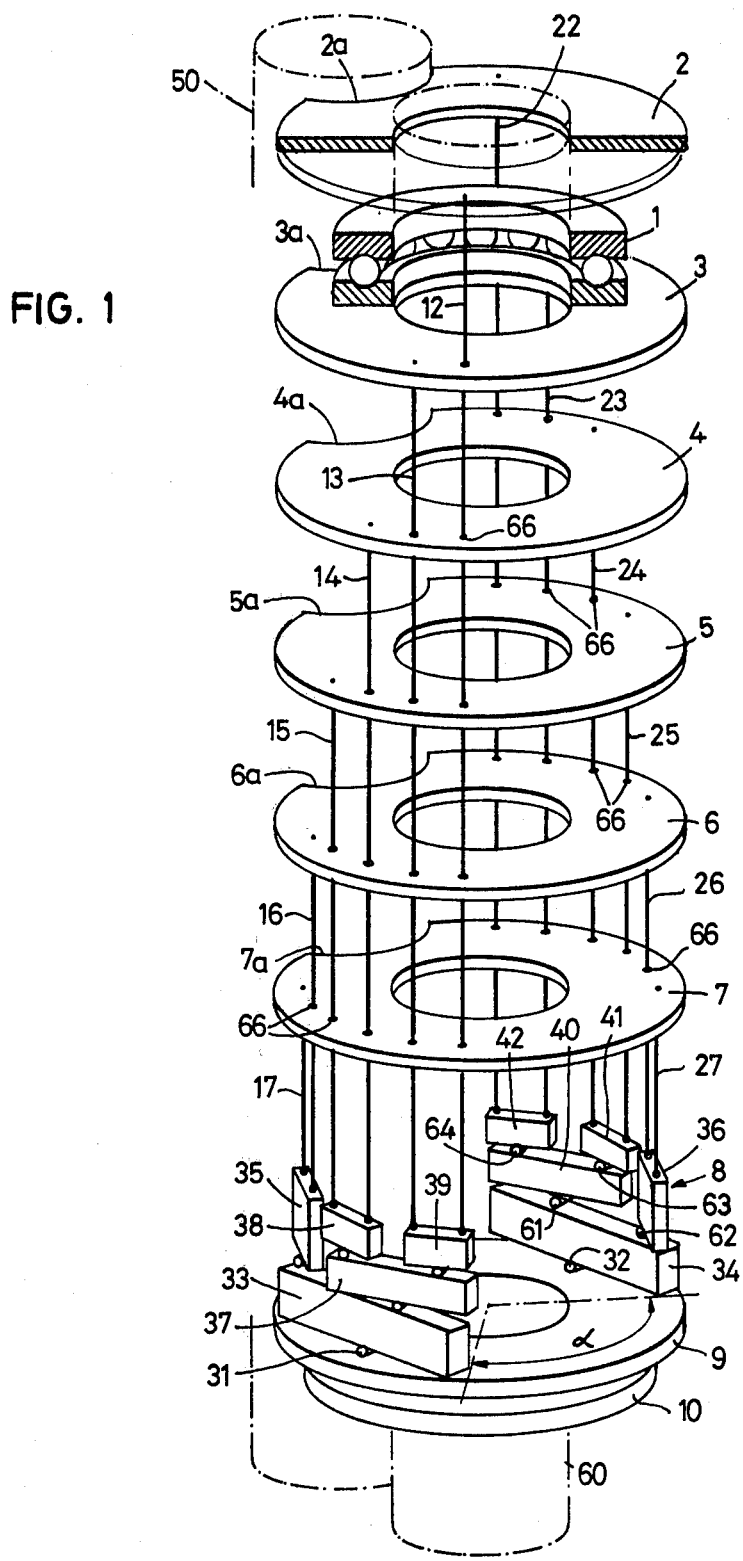

United States Patent [19]

Coster

[11] 4,042,284

[45] Aug. 16, 1977

[54] THRUST BEARING ASSEMBLY

[75] Inventor: Norbert Coster, Luxembourg, Luxembourg

[73] Assignee: SOFISA (Societe Financiere S.A.), Luxembourg

[21] Appl. No.: 677,821

[22] Filed: Apr. 16, 1976

[30] Foreign Application Priority Data

Apr. 22, 1975 Switzerland .......................... 5099/75
Mar. 26, 1976 Switzerland .......................... 3817/76

[51] Int. Cl.² ............................................. F16C 27/08
[52] U.S. Cl. .................................................. 308/219
[58] Field of Search ............... 308/135, 140, 160, 219, 308/227, 232, 230, 225

[56] References Cited

U.S. PATENT DOCUMENTS 3,652,140  3/1972  Bruno et al. ..................... 308/219

Primary Examiner—Joseph F. Peters, Jr.
Assistant Examiner—Gene A. Church
Attorney, Agent, or Firm—Stevens, Davis, Miller & Mosher

[57] ABSTRACT

A thrust bearing assembly for supporting a rotating shaft, for example, in a multiscrew extruder, having a support, two rows of coaxially arranged bearing elements in cooperating pairs forming a line of bearings in tandem, the elements in one row rotating with the shaft and those of the other row being stationary with the support, means for axially adjusting the elements of one of the forementioned rows for equally distributing axial thrust on the bearing which adjusting means includes a plurality of tilt means which are biased by at least two of the adjustable bearing elements.

18 Claims, 3 Drawing Figures

THRUST BEARING ASSEMBLY

This invention relates to thrust bearings. More particularly, it relates to a thrust bearing assembly intended to support a rotating shaft, especially in a multiscrew extruder.

The design of thrust bearings intended to hold the screws of multiscrew extruders in place presents particular difficulties in that these screws, when in operation, must withstand very great axial forces, whereas in order for the extruder to function properly, the screws must be in immediate proximity to one another. As a result, the thrust bearing devices used in such extruders must be of extremely small diameter. It has already been sought to find a solution to this problem by providing at the end of at least one of the screws a thrust bearing assembly comprising several bearings mounted in tandem. These bearings may be of the slider type, with forced lubrication, or of the rolling type. However, it is obviously essential that when such bearings are assembled, their stationary portions be axially positioned precisely enough for the axial thrust to be equally distributed on the several bearings; for the dimensions of each bearing are such that it is stressed at its maximum load having regard to its diameter, so that unevenness in the distribution of the loads very quickly leads to overloading liable to destroy the bearings.

In the case of thrust bearing assemblies utilizing roller bearings, it has already proposed to insert, between the stationary races of the different bearings, calibrated bushings capable of giving way resiliently under the effect of a load exceeding a given limit, so that irregularities due to the inevitable manufacturing tolerances over the distances between the races of the different moving parts are compensated for by the resilient deformation of the interposed bushing. However, this design has not proved sufficiently reliable. Moreover, it has led to the production of thrust bearings of such large diameter that it is not possible to place the screws close enough to one another.

It is an object of this invention to provide a thrust bearing assembly capable of supporting maximum loads, having regard to the diameter of the shaft element with which the thrust bearing is associated, and at the time designed in such a way that it is possible to place a second shaft element in immediate proximity to the one borne by the thrust bearing.

The thrust bearing assembly according to the present invention is not intended solely to support a screw in a multiscrew extruder but may be used in all cases where it is necessary to dispose any sort of mechanism in immediate proximity to a shaft subjected to considerable axial thrust.

To this end, there is provided according to the present invention a thrust bearing assembly intended to support a rotating shaft, especially in a multiscrew extruder, comprising a support, two rows of coaxial bearing elements cooperating in pairs and thereby forming a line of bearings in tandem, the elements of one row being rotating and integral with a first member consisting of the shaft and the elements of the other row being stationary and integral with a second member consisting of the support, and means acted upon by the axial thrust exerted by the shaft for axially adjusting the elements of one of the rows to distribute this thrust equally on the bearings, wherein the adjusting means comprise a plurality of tilt means disposed between the row of adjustable elements and the member which these elements are integral, each tilt means being directly or indirectly biased by at least two adjustable bearing elements respectively acting upon it one on each side of its tilting axis.

The adjustable bearing elements may be either the series of bearing elements integral with the support or the series of bearing elements which rotate with the shaft.

Figure 2:
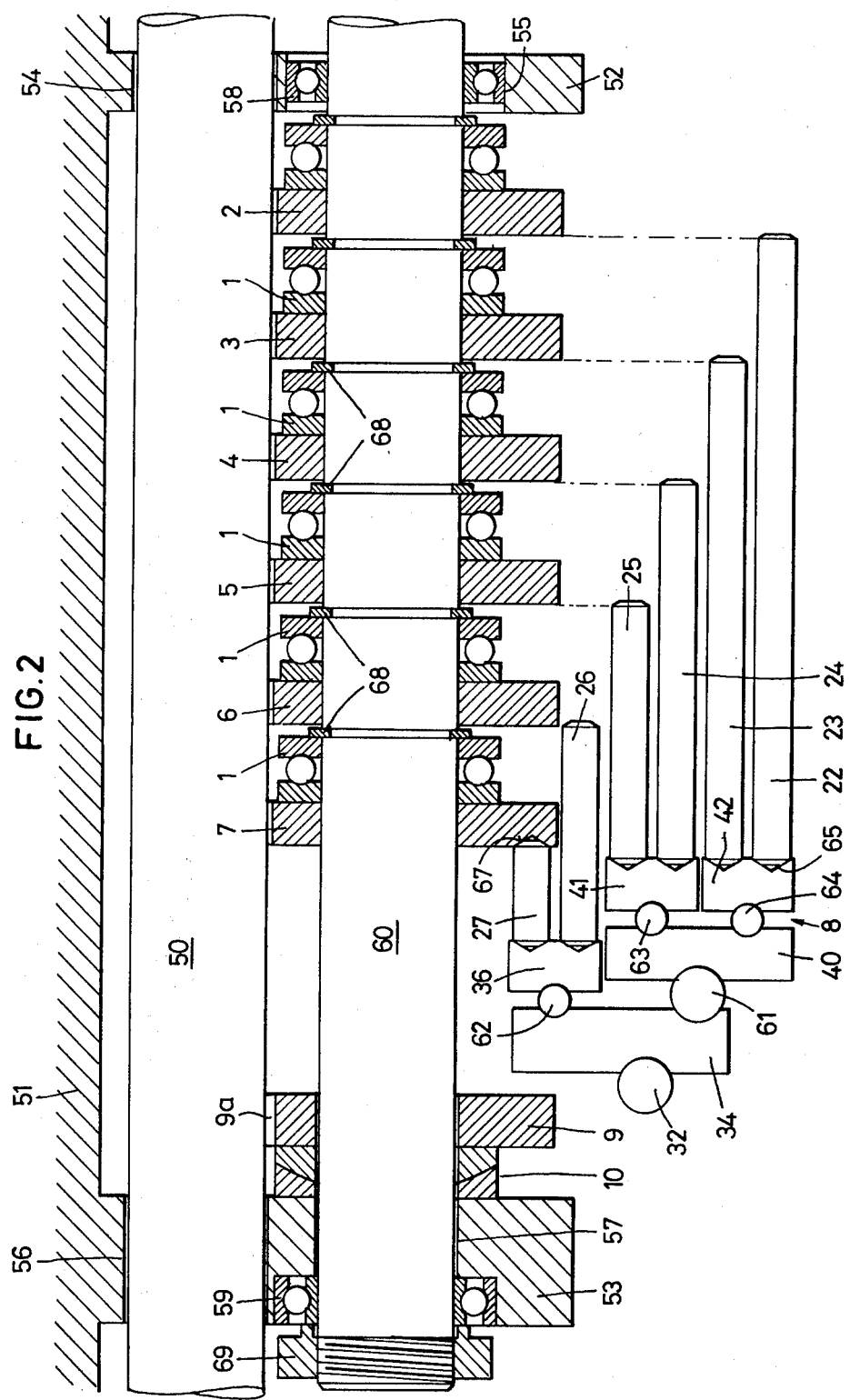
Figure 3:
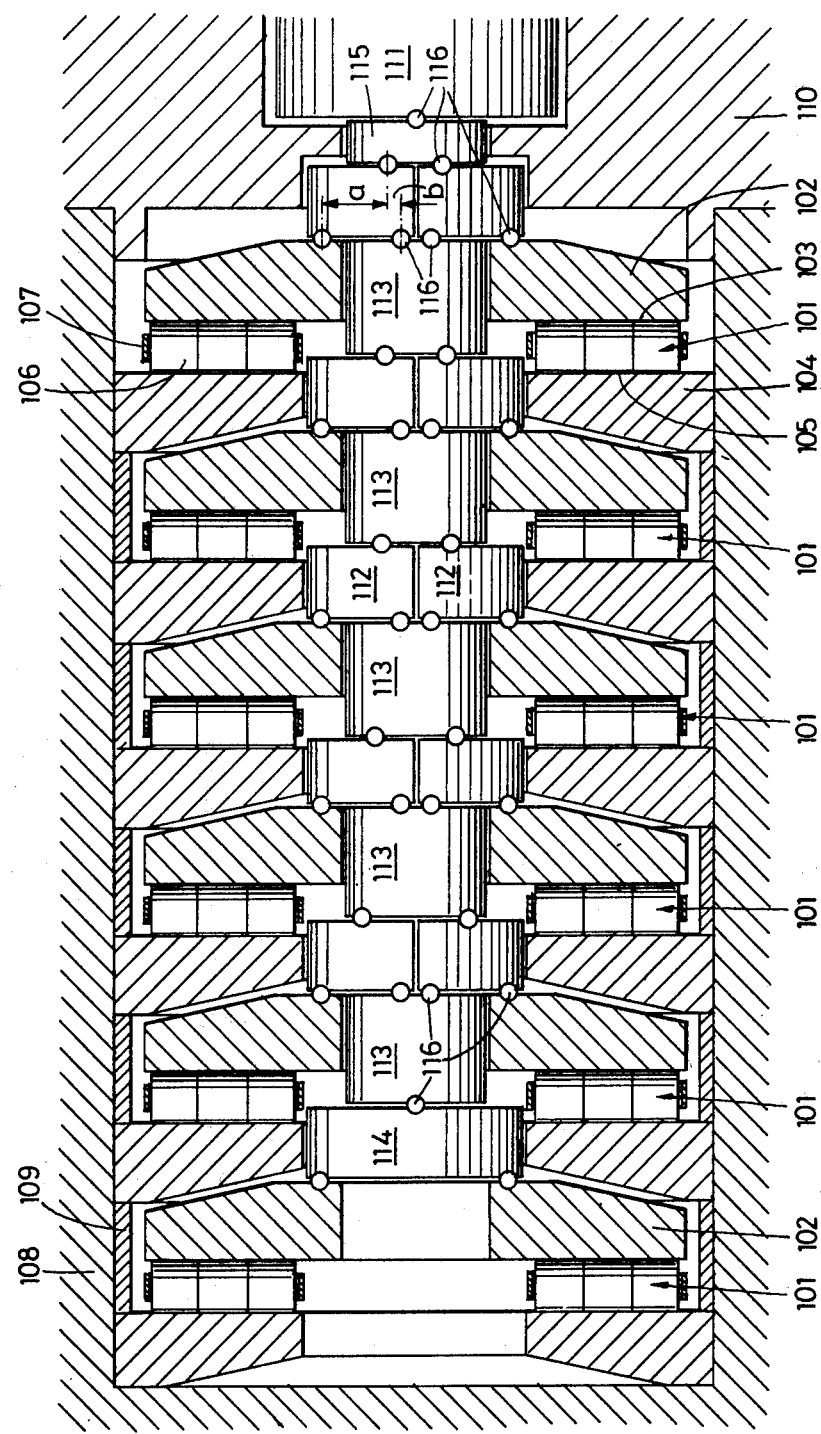

Two possible embodiments of the invention will now be described in detail with reference to the accompanying drawings, in which:

FIG. 1 is a schematic perspective view, partially in section, of a first embodiment, FIG. 2 is a sectional view of the thrust bearing assembly illustrated in FIG. 1, taken on a plane containing the axes of two parallel shaft portions, certain elements being shown developed, and FIG. 3 is a longitudinal section through a second embodiment.

The principle of the thrust bearing assembly depicted in the drawings follows the FIG. 1, which shows this assembly in a vertical position, although, normally, the screws of extruders are disposed horizontally. The assembly comprises six rolling thrust bearings, such as the bearing 1, which may be either roller or ball bearings. The stationary race of each of these bearings is integral with a floating support ring, the six floating support rings 2, 3, 4, 5, 6, and 7 being disposed in tandem and engaged on a shaft portion 60 to which the rotary parts of the bearings 1 are fixed. The rings 2–7 are each supported by two floating support bars 12, 22; 13, 23; 14, 24, etc. All these bars are parallel to the longitudinal axis of the thrust bearing assembly and rest at the end thereof against a plurality of tilt means, designed as a whole by reference numeral 8, supported by a bearing plate 9 mounted by means of a ball-and-socket joint 10 on a side-plate 53 forming part of the support of the bearing assembly. The front face of the plate 9 is flat; via two rollers 31 and 32, it supports two primary rocking bars 33 and 34. These two rocking bars are parallel to one another, and their pivoting axes, of which the rollers 31 and 32 are the concrete manifestations, coincide. Each of the rocking bars 33 and 34 supports at its one end a secondary rocking bar 35, 36, while at its other end it supports a subassembly composed of three secondary rocking bars 37, 38, 39; 40, 41, 42. The rocking bars 35, 38, 39, 36, 41, 42 directly support the floating bars 12, 22; 13, 23; 14, 24, etc. The link system formed by the floating bars, the rocking bars, and the support rings necessarily assumes, under the effect of the axial thrust to which the shaft portion 60 is subjected, a position such that the various barings 1 are equally loaded.

The bearing assembly being described also includes guide means intended to keep the support rings 2–7 constantly in proper orientation by taking up the rotational driving force to which the stationary parts of the bearings are subjected owing to friction. In this embodiment, these guide means consist of notches 2a, 3a, 4a, etc. in the respective peripheries of the rings 2–7. These notches are engaged on a guide element disposed in proximity to the bearing assembly. The guide element, which may be placed very close to the axis of the bearing assembly, may consist of a shaft portion 50 forming part of a screw cooperating with the one which is integral with the shaft portion 60. Other means may also be provided for performing this function, as will be seen further on.

FIG. 2 shows the construction of the thrust bearing assembly diagrammatically. It comprises a stationary frame 51, not shown in detail, which bears two side-plates 52 and 53, each provided with two openings 54, 55 and 56, 57 having parallel axes. The openings 55 and 57 are respectively equipped with rolling bearings 58 and 59 which support the shaft portion 60 constituting the rearward end of one of the screws of the extruder. The openings 54 and 56, on the other hand, are provided solely for the passage of the shaft portion 50 extending from the rearward end of the second screw of the extruder. This second screw will likewise be supported by radial bearings and by a thrust bearing assembly, but these elements are disposed behind the thrust bearing assembly with which the shaft portion 60 is equipped and are not shown. The side-plate 53 also bears the ball-and-socket joint 10, the movable part of which bears the bearing plate 9. Like the support rings 2–7, the plate 9 includes an arcuate notch 9a which is adapted to the size of the shaft portion 50.

FIG. 2 shows the developed surfaces of half of the tilt means 8, with the primary rocking bar 34, the group of rocking bars 40, 41, 42, and the secondary rocking bar 36. The rocking bar 34 is supported by the roller 32, while the rocking bars 40 and 36 are supported by the rollers 61 and 62, and the rocking bars 41 and 52 by the rollers 63 and 64. All the rollers are cylindrical parts made, for example, of hardened steel and engaged in grooves in the rocking bars, whereby the various elements are centered.

FIG. 2 also shows the support bars 22, 23, 24, 25, 26, and 27. Each of these bars has a frustoconical portion at each end. In the surfaces of the rocking bars 36, 41, and 42 facing the bearings, there are conical recesses 65 for receiving the ends of the support bars. Moreover, each of the support rings 3 – 7 has a number of holes, such as the hole 66 (FIG. 1), for admitting the support bars which support the rings ahead of it. These holes have a diameter allowing sufficient play for the support bars to pass freely through them. The ends of the support bars 12–17 and 22–27 facing the bearings are also frustoconical; they each engage in a respective conical recess in the appropriate support ring, one of the recesses 67 in the support ring 7 being shown in FIG. 2.

The thrust bearings 1 are likewise to be seen in FIG. 2. It is apparent that the races integral with the shaft 60 are engaged directly thereon and held in place by spring rings 68.

The thrust bearing assembly is held together by a bolt 69 screwed onto the shaft 60 against the bearing 59. The shaft portion 60 might be extended towards the rear of the bearing assembly so as to support either a pinion or a pulley for driving the screw rotatingly. However, the drive means might equally well be situated elsewhere.

As has already been stated, the support rings 2–7 might be kept properly oriented by other means than the notches 2a–7a. For instance, each of the support rings 2 – 7 could have a round aperture or a profiled notch in which to engage a fixed element such as a cylindrical bar or a key-shaped part which would be integral with the frame of the bearing assembly and which would keep the support rings properly oriented. This key or bar should be engaged in the notches or apertures provided for it with a carefully selected amount of play so that the different elements will be kept oriented with the required precision without hindering the axial movements of the support bars when the bearing assembly is being run in, or when there are fluctuations in temperature or variations in thrust.

Instead of the frustoconical heads at the ends of the support bars and the conical recesses in the rocking bars and the support rings, the means used to connect the support rings, the floating support bars, and the rocking bars might consist of projecting elements integral with the support rings and the blocking bars, in the form of balls and sockets, for instance. In this case, the ends of the support bars might have socket-like recesses fitted to the balls. The recesses 65 might also be concave and the ends of the support bars rounded.

Moreover, although the tilt means 8 have been shown schematically in the form of parallelepipeds — bars or blocks — supported by rollers, it is to be understood that other designs are also possible. Thus, for example, the primary rocking bars 33 and 34 might each have a cylindrical spindle integral with the rocking bar, with the ends of the spindle resting on bearings integral with the plate 9. The primary rocking bars could then be sunk in recesses within the plate 9. Instead of the rollers 61–64, provision might be made for projecting elements, e.g., prism-shaped elements made in one piece with the rocking bars, resting, for example, in V-shaped grooves in the adjacent bars. The tilt means might be held in place by a cage, if need be.

In still another embodiment, the floating support bars, instead of being completely free between the rocking bars and the floating support rings, might be guided by the frame of the thrust bearing assembly so as not to transmit forces and to move only in a direction strictly parallel to the longitudinal axis of the thrust bearing assembly. In this case, the support rings 2–7 might be of narrower construction than shown in FIG. 1 and each have two radial lugs resting on the ends of the two bars which support them. The support bars 12, 22; 13, 23; 14, 24, etc., might then be engaged, between the support ring which they support and the rocking bars, in guide sleeves integral with the frame of the thrust bearing assembly and fitted so as to slide in these sleeves without play. In an embodiment of this kind, the means of guiding the support bars and their linkage to the support rings might also serve as a means for holding the support rings circumferentially, so that the outside guide means previously described, such as a guide-bar or guide-key, would no longer be needed.

The arrangement described distributes the thrust to which the shaft portion 60 is subjected equally on the several bearings 1, for the latter are connected to the rocking bars in pairs, each pair being supported by four support bars, such as the bars 13, 23, and 12, 22, and by two rocking bars, e.g., the rocking bars 39 and 42 for the two upper thrust bearings, so that the thrust is distributed equally on the two bearings of each pair. Between the two pairs of upper bearings respectively supported by the rocking bars 39, 42 for the first pair, and 38, 41 for the second pair, the equilibration is effected via the rocking bars 40 and 37, which will thus ensure an equal distribution of forces among the first four thrust bearings. The same applies to the third pair of bearings: there will be an equilibration of the thrust to which it is subjected relative to that to which the first two pairs are subjected, owing to the primary rocking bars 33 and 34 and to the rollers 31 and 32. In the case of the rocking bars 36, 41, 42, 35, 38, and 39, of course, the rollers which support them will be disposed halfway between the points of support of the support bars. This will also apply to the rocking bars 37 and 40. The rollers 31 and 32, on the other hand, will be placed in such a way as to divide in a one-third to two-thirds ratio the distance between the fulcra of the secondary rocking bars so that the distribution of the load between the rocking bars 36 and 40 will be in the same ratio. The same will apply to the rocking bar 33. In an embodiment comprising eight thrust bearings 1, provision will have to be made for four additional floating support bars resting on two rocking bars cooperating with the rocking bars 36 and 35 to act upon the primary rocking bars 33 and 34 via two rocking bars homologous to the parts 40 and 37. In this case the rollers 31 and 32 would obviously be situated midway along these primary rocking bars. The arrangement described may therefore be constructed with a greater or lesser number of rocking bars, and it achieves an equilibration of the thrust acting upon the several bearings with wide margins for variation in the sizes and exact positioning of the bearings along the shaft.

The great advantage of the system described here becomes apparent upon consideration of FIG. 1. It is, in fact, possible to distribute each of the two halves of the tilt means 8, with the groups of support bars 12–17 and 22–27, respectively, within the limits of sectors each enclosing an angle of about 100° to 100°. These two sectors being diametrically opposed, it will be seen that there remains between them a sector-shaped zone, the angle of opening $\alpha$ of which may reach 70°. Now this zone is free all along the length of the thrust bearing assembly. It is therefore possible to engage therein an element alien to the assembly, e.g., the shaft portion 50, and to place it at a distance from the axis of the assembly which is much shorter than the minimum distance it is possible to achieve with a thrust bearing assembly of generally cylindrical design, such as those known heretofore, utilizing resilient support bushings.

By way of example, in a double-screw extruder in which the shaft portion carrying the bearings 1 is 55 mm. in diameter, it is possible to place the axes of the two shafts about 70 mm. apart and, by using a six-bearing assembly like the one described above, to support a load of up to 18 tons.

The thrust bearing assembly illustrated in FIG. 3 comprises a series of six roller thrust bearings 101. Each of the bearings 101 comprises, first, a rotating bearing element 102 consisting of a ring part having a plane race 103, and second, a stationary bearing element 104 consisting of a ring part having a plane race 105. Disposed between the rotating and stationary elements 102 and 104 of each bearing 101 are rollers 106 held in place by a cage 107. The six stationary elements 104 are rigidly secured in a frame 108 which constitutes the support of the thrust bearing assembly. They may, for example, be fitted snug in a cylindrical housing in the support frame 108 and held in position by rigid spacer rings 109. As may be seen in the drawing, the center opening of the stationary elements 104 is larger in diameter than that of the rotating elements 102. The front end of the support frame 108 is secured to a body 110 which may form part of the frame of a machine comprising a rotating shaft 111 subjected in operation to considerable axial thrust, e.g., the screw of a multiscrew extruder. This axial thrust is distributed among the several bearings 101 via tilt means 112 and a group of floating shaft elements 113. The tilt means 112 comprise ten rocking blocks in tandem, divided into pairs, each pair being associated with one of the first five bearings 101. Moreover, each floating shaft element 113 is associated with one of the pairs of rocking blocks so as to transmit the residual thrust to the following pairs of rocking blocks. The last floating shaft element 113 does not transmit the residual thrust to further rocking blocks but to a cylindrical spacer 114 supported by the rotating element 102 of the last bearing 101. The thrust bearing assembly further comprises a second cylindrical spacer 115 disposed at its front end between the shaft 111 and the first pair of rocking blocks 112.

Each rocking block 112 takes the form of a rigid body having a semicircular cross-section. It is defined by two plane, parallel end faces, a plane side face, and a semicylindrical side face. Thus the two rocking blocks 112 of each pair occupy a cylindrical space coaxial with the thrust bearing assembly, their plane side faces being parallel and disposed symmetrically with respect to a diametric plane containing the longitudinal axis of the assembly. Each pair of rocking blocks is engaged with a slight amount of play in the center opening of one of the stationary elements 104, except for the first pair, which is accommodated in a cavity in the body 110. Each shaft element 113 is likewise engaged with a slight amount of play in the center opening of one of the rotating elements 102. The result is a very compact arrangement.

The spacers 114, 115, the floating shaft elements 113, and the rocking blocks 112 pivot upon one another, as well as upon the bearing elements 102 and upon the shaft 111, by means of straight, cylindrical bars 116 which determine their pivoting axes. All these axes are parallel to one another and parallel to the diametric plane along which the plane side faces of the rocking blocks 112 are oriented. The bars 116 are engaged in grooves of semicylindrical cross-section in the plane end faces of the members which pivot upon them. Thus a pivot-bar 116 is disposed between the plane end face of the shaft 111 and one of those of the spacer 115. Its length is equal to the diameter of the cylindrical spacer 115.

The first pair of rocking blocks 112 is linked to the spacer 115 by two pivot-bars 116 situated one on each side of the plane separating the two rocking blocks of the pair. These two rocking blocks both rest against the first rotating element 102 and against the first floating shaft element 113 via bars 116 which are parallel to one another. The bars 116 by means of which the rocking blocks 112 of the first pair pivot on the first floating shaft element 113 are situated closer to the plane separating the two rocking blocks than are the pivot-bars 116 between these rocking blocks and the spacer 115. The pivot-bars linking the rocking blocks of the first pair to the first element 102, on the other hand, are further away from the plane of separation than those between the spacer 115 and the first two rocking blocks.

As will be seen further on, the first floating shaft element 113 is supported by the remaining bearings. The thrust exerted by the shaft 111 upon the spacer 115 is therefore equally distributed to each of the two rocking blocks 112 of the first pair. Furthermore, each rocking block of this pair transmits the thrust to which it is subjected to the first floating shaft element 113, on the one hand, and to the first rotating bearing element 102, on the other hand, the distribution being inversely proportional to the ratio between distances $a$ and $b$ measured radially between the axes of the bars 116 linking the rocking block to, respectively, the rotating element 102 and the spacer 115, in the one case ($a$); and between the axes of the bars 116 linking the rocking block to, respectively, the spacer 115 and the floating shaft element 113, in the other case (b).

It will be readily understood that the first floating shaft element 113 rests against the two rocking blocks 112 of the second pair in exactly the same way as the spacer 115 rests against the first pair of rocking blocks. Thus the thrust transmitted is distributed to the second rotating bearing element 102, on the one hand, and to the second floating shaft element 113, on the other hand. The distribution of the thrust continues in the same way between the third rotating bearing element and the third floating shaft element, then in like manner at the levels of the fourth and fifth bearings. The fifth pair of rocking blocks transmits the thrust which it receives to the fifth bearing and to the fifth floating shaft element. The latter rests against the cylindrical spacer 114, to which it is linked by a single pivot-bar 116. The spacer 114 rests in turn against the rotating element 102 of the last bearing 101 via two pivot-bars 116.

The ratios between the distances a and b, measured radially between the pivot-bars at the level of the several pairs of rocking blocks, need only be properly calculated in order for the axial thrust exerted by the shaft 111 to be equally distributed among the bearings. In the embodiment described, where there are six bearings, these ratios between the lengths of the lever-arms a and b will be 5 : 1 for the first pair of rocking blocks, 4 : 1 for the second, 3 : 1 for the third, 2 : 1 for the fourth, and 1 : 1 for the fifth. Thus the pivot-bars linking the fifth pair of rocking blocks to the elements with which it cooperates are so disposed that the relationship between the lever-arms a and b is $a = b$, as may be seen in the drawing. The residual thrust on the last floating shaft element 113 is transmitted in its entirety to the last rotating element 102 by the spacer 114. The result is therefore a thrust bearing assembly of a sturdy design which may be greatly reduced in diameter as compared with the prior art. Whatever the number of thrust bearings disposed in tandem to take up the total axial thrust, this trust is equally distributed over the several bearings owing to the flexibility of the link system made up of the tilt means and the group of floating shaft elements.

As a variation, the pivot-bars 116 might be replaced by triangular or trapezoidal ribs projecting from the rocking blocks 112 and the spacers 114 and 115.

Although in the embodiment described, the pivoting axes of all the rocking blocks are parallel, this is not obligatory; for while the axes of the six pivoting members linking a pair of rocking blocks to the elements with which this pair cooperates must naturally be parallel to each other, the orientation of these axes might vary from one pair of rocking blocks to the next.

In the two embodiments illustrated and described, the mechanical elements ensuring the equal distribution of thrust to the several bearings are simple, sturdy elements which undergo practically no wear and tear and which automatically adjust when the machine is placed under load. The assembly described is capable of withstanding substantial jolts when in operation. The distribution of the load among the different bearings may vary while the screw is operating, particularly under the influence of temperature fluctuations. The thrust bearing assembly described easily withstands such variations in operating conditions.

The term "tilt means" in the claims which follow is to be understood in a general sense and encompasses all mechanical, hydraulic, or other devices having properties equivalent to the means described. Thus, for example, the tilt means 8 might be replaced by group of cylinders mounted on the plate 9. A piston having an axis parallel to that of the thrust bearing assembly slides in each cylinder. The cylinders are filled with an appropriate fluid, and at least some of them intercommunicate. Each of the support bars 12–17 and 22–27 is linked to or is integral with one of these pistons and rests against it. In this way, too, an equal distribution of all the forces borne by the rings 2–7 is achieved.

What is claimed is:

1. A thrust bearing assembly intended to support a rotating shaft, especially in a multiscrew extruder, comprising a support, two rows of coaxial bearing elements cooperating in pairs and thereby forming a line of bearings in tandem, said elements of one said row being rotating and integral with a first member consisting of said shaft, and said elements of the other said row being stationary and integral with a second member consisting of said support, and means acted upon by axial thrust exerted by said shaft for axially adjusting said elements of one of said rows to distribute said thrust equally on said bearings, wherein said adjusting means comprise a plurality of tilt means disposed between said row of adjustable elements and said member with which said elements are integral, each said tilt means being directly or indirectly biased by at least two said adjustable bearing elements respectively acting upon it one on each side of its tilting axis.

2. A thrust bearing assembly in accordance with claim 1, wherein said adjustable elements are said stationary elements.

3. A thrust bearing assembly in accordance with claim 2, further comprising a bearing plate and a plurality of floating support bars resting on said tilt means, wherein said adjustable bearing elements are axially supported by said support bars, said tilt means being supported by said bearing plate.

4. A thrust bearing assembly in accordance with claim 3, wherein said tilt means are distributed about the longitudinal axis of said assembly and are each mounted for pivoting about an axis extending radially with respect to said longitudinal axis.

5. A thrust bearing assembly in accordance with claim 3, wherein each of said adjustable bearing elements is supported by two said support bars which are parallel and diametrically opposed with respect to said longitudinal axis.

6. A thrust bearing assembly in accordance with claim 5, wherein said adjustable elements rest in pairs against said tilt means, for four said support bars associated with each said pair of adjustable bearing elements resting against two said tilt means which are parallel and disposed one on each side of said longitudinal axis.

7. A thrust bearing assembly in accordance with claim 3, wherein said tilt means comprise a pair of primary tilt means resting against said bearing plate and secondary tilt means supported by said primary tilt means.

8. A thrust bearing assembly in accordance with claim 7, wherein at least two said secondary tilt means each support at their ends two said tilt means against which certain of said floating support bars rest.

9. A thrust bearing assembly in accordance with claim 3, wherein said floating support bars and said tilt means are distributed about the longitudinal axis of said assembly in two diametrically opposed sectors each having an angle of opening of about 110°.

10. A thrust bearing assembly in accordance with claim 9 comprising six said bearings, wherein each said primary tilt means supports at one end a secondary tilt means in turn supporting two tilt means against which certain of said support bars rest, and at the other end a tilt means upon which certain of said support bars rest, said tilting axis of each said primary tilt means dividing in a ratio of one-third to two-thirds the distance between said tilting axes of said secondary tilt means resting thereon.

11. A thrust bearing assembly in accordance with claim 3, further comprising stationary guide means for maintaining the orientation of said adjustable bearing elements.

12. A thrust bearing assembly in accordance with claim 1, wherein said adjustable bearing elements are said rotating elements.

13. A thrust bearing assembly in accordance with claim 12, further comprising a plurality of floating shaft elements coaxial with said assembly, wherein said tilt means are distributed in tandem in successive pairs, the two said tilt means of each said pair resting against both a said rotating bearing element and a said floating shaft element, and each said floating shaft element but the last resting in turn against the two said tilt means of the following said pair.

14. A thrust bearing assembly in accordance with claim 13, further comprising linking means having parallel axes for linking said tilt means to said rotating bearing means and to said floating shaft elements.

15. A thrust bearing assembly in accordance with claim 14, wherein said tilt means, said rotating bearing elements, and said floating shaft elements each exhibit one or more grooves, said linking means comprising cylindrical rods accommodated in said grooves.

16. A thrust bearing assembly in accordance with claim 15, wherein each said tilt means is a body having a semicircular cross-section, a plane side face, and a semicylindrical side face.

17. A thrust bearing assembly in accordance with claim 12, wherein said bearings are roller thrust bearings each comprising two races integral with a said rotating bearing element and a said stationary bearing element, respectively.

18. A thrust bearing assembly in accordance with claim 13, further comprising a first cylindrical spacer member disposed between one end of said shaft and the first said pair of tilt means, and a second cylindrical spacer member disposed between the last said floating shaft element and the last said bearing, each of said spacer member being linked to the preceding part by a linking means having its axis parallel to said linking means of said tilt means.

* * * * *